US010628766B2

(12) United States Patent
Sirmokadam et al.

(10) Patent No.: US 10,628,766 B2
(45) Date of Patent: Apr. 21, 2020

(54) METHOD AND SYSTEM FOR ENABLING DYNAMIC CAPACITY PLANNING

(71) Applicant: TATA CONSULTANCY SERVICES LIMITED, Mumbai (IN)

(72) Inventors: Sumukh Sudhakar Sirmokadam, Mumbai (IN); Mahesh Kshirsagar, Mumbai (IN); Sumit Raut, Kolkata (IN); Muralidharan Somasundaram, Siruseri (IN); Sumit Inderjeet Juneja, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 1013 days.

(21) Appl. No.: 15/057,714

(22) Filed: Mar. 1, 2016

(65) Prior Publication Data
US 2017/0017918 A1 Jan. 19, 2017

(30) Foreign Application Priority Data
Jul. 14, 2015 (IN) .......................... 2661/MUM/2015

(51) Int. Cl.
G06Q 10/06 (2012.01)
G06F 11/34 (2006.01)
(Continued)

(52) U.S. Cl.
CPC .. *G06Q 10/063116* (2013.01); *G06F 11/3442* (2013.01); *G06F 11/3447* (2013.01);
(Continued)

(58) Field of Classification Search
CPC .......... G06Q 10/0631; G06Q 10/06313; G06F 11/3442; G06F 11/3447
(Continued)

(56) References Cited

U.S. PATENT DOCUMENTS 6,587,831 B1 7/2003 O'Brien
7,822,630 B1 * 10/2010 Smyth ................ G06Q 30/0202
702/19
(Continued)

FOREIGN PATENT DOCUMENTS

JP 2005-234852 9/2005
JP 2008-166950 7/2008

OTHER PUBLICATIONS

Suresh Kumar Sreenivas Shenoy, "Management of Customized Functionalities Associated to an Organization", Indian Patent Application No. IN/1563/CHE/2010, (Jun. 7, 2010).
(Continued)

*Primary Examiner* — Johnna R Loftis
(74) *Attorney, Agent, or Firm* — Finnegan, Henderson, Farabow, Garrett & Dunner LLP

(57) ABSTRACT

Method and system for enabling dynamic capacity planning are disclosed. In an embodiment, a plurality of operational inputs are configured to forecast a demand volume and generate a dynamic capacity planning schedule. For example, said plurality of operational inputs include raw data received from a server. Further, historical data is processed based on said plurality of operational inputs to create a plurality of contextual data elements. Furthermore, said demand volume is forecasted and said dynamic capacity planning schedule is generated using at least a part of the historical data and a current capacity planning requirement, said current capacity planning requirement is being generated dynamically by said server. In addition, said dynamic capacity planning schedule is rendered based on said forecasted demand volume and said rendered dynamic capacity planning schedule is clustered into a plurality of work reports associated with said plurality of contextual data elements.

10 Claims, 4 Drawing Sheets

(51) Int. Cl.
*G06Q 10/04* (2012.01)
*G06Q 10/10* (2012.01)

(52) U.S. Cl.
CPC .......... *G06Q 10/04* (2013.01); *G06Q 10/063* (2013.01); *G06Q 10/0631* (2013.01); *G06Q 10/105* (2013.01)

(58) Field of Classification Search
USPC .............................................. 705/7.12, 7.23
See application file for complete search history.

(56) References Cited

U.S. PATENT DOCUMENTS

| | | | |
|---|---|---|---|
| 8,264,971 B2 | 9/2012 | Alfano et al. | |
| 2002/0184074 A1* | 12/2002 | Chen | G06Q 10/06 700/100 |
| 2003/0236961 A1* | 12/2003 | Qiu | H04L 67/2852 711/170 |
| 2004/0107133 A1 | 6/2004 | Pantaleo et al. | |
| 2005/0222884 A1 | 10/2005 | Ehret et al. | |
| 2007/0101000 A1 | 5/2007 | Childress et al. | |
| 2008/0167929 A1* | 7/2008 | Cao | G06Q 10/06 705/7.11 |
| 2008/0167930 A1* | 7/2008 | Cao | G06Q 10/06 705/7.14 |
| 2009/0157579 A1* | 6/2009 | Rai | G06N 3/02 706/21 |
| 2013/0166724 A1* | 6/2013 | Bairavasundaram | G06F 9/5016 709/224 |

OTHER PUBLICATIONS

SAP, "Shift Planning (PT-SP)", http://help.sap.com/saphelp_46c/helpdata/en/54/095fac72f911d1a910080009ab6b44/content.htm, pp. 1-39, 2014.

MJC, "Employee Scheduling & Human Resource Planning", http://www.mjc2.com/employee-scheduling-software.htm, 2 pages, 2015.

* cited by examiner

METHOD AND SYSTEM FOR ENABLING DYNAMIC CAPACITY PLANNING

PRIORITY CLAIM

This U.S. patent application claims priority under 35 U.S.C. § 119 to: India Application No. 2661/MUM/2015, filed on Jul. 14, 2015. The entire contents of the aforementioned application are incorporated herein by reference.

TECHNICAL FIELD

The embodiments herein generally relate, to capacity planning for a plurality of human resources, and more particularly, to facilitating dynamic capacity planning at an organization level in a precise and accurate manner.

BACKGROUND

Managing the allocation of human resources and planning the optimal team capacity in the services sector is becoming increasingly complex because of the dynamic nature of allocating work schedules. Operations are often challenged with managing seemingly unmanageable work volumes with available staff. At times, the staff may feel overwhelmed with high work volumes, or underutilized during periods of low work volumes. Considerable amount of manual effort is spent on creating resource allocation schedules on a day to day basis.

Implementing human resource allocation schedule is of paramount importance as this allows organization to plan, assign and serve client needs in an optimal manner without exploitation or wastage of resources. Small scale organization usually make use of manual techniques or rough ratio-proportion methods to come up with a resource allocation or a capacity planning schedule. Certain other organizations use certain computational techniques by means of a heuristic approach and often equate human resource planning with material requirement planning techniques that do not quite scale up to the demands of a human resource requirement sector which is usually unpredictable and constantly changing in nature.

Human resource allocation, alternatively referred to as capacity planning is a method for using available human resources to assign and ensure completion of pre-defined tasks to meet service level agreements which is considered to be of utmost importance. Human resource allocation is typically performed by a Project manager exercising the Project manager's knowledge of the skills of the team members and their current tasks to determine optimal ways of allocating new or additional tasks within the team.

In one existing approach, a forecasting engine and a scheduling engine are utilized along with the static and dynamic human resource data of the organization. The static and dynamic human resource data is available in a manpower management system and this data is computed to arrive at approximate manpower hours using forecasted business volumes. The approach also provides for modifying, distributing and adjusting the generated manpower plan and schedule and is quite fundamental in nature.

Generally, it still continues to be quite a laborious and computationally intensive task to generate an optimal and dynamic resource allocation schedule which also satisfies the Service Level Agreements (SLAs) of varying nature such as fixed or constant SLAs and dynamic or variable SLAs. Therefore, current manual as well as automated techniques used in capacity planning have several inherent limitations pertaining to (a) the historical volume of data that can be processed (b) inability to perform real-time dynamic and an artificial intelligence embedded data analysis.

SUMMARY

Embodiments of the present disclosure present technological improvements as solutions to one or more of the above-mentioned technical problems recognized by the inventors in conventional systems. In view of the foregoing, an embodiment herein provides a computer implemented method for enabling a dynamic capacity planning mechanism where the method comprises configuring, by one or more hardware processors, a plurality of operational inputs to forecast a demand volume and generate a dynamic capacity planning schedule, wherein the plurality of operational inputs comprise raw data received from a server, processing, by the one or more hardware processors, historical data based on the plurality of operational inputs to, create a plurality of contextual data elements. Further, the method comprises demand volume forecasting and generation of said dynamic capacity planning schedule, by the one or more hardware processors, using at least a part of the historical data and a current capacity planning requirement, wherein the current capacity planning requirement is being generated by the server, and rendering, by the one or more hardware processors, said dynamic capacity planning schedule based on the forecasted demand volume, wherein the rendered dynamic capacity planning schedule is clustered into a plurality of work reports associated with the plurality of contextual data elements.

In another embodiment, a computer implemented system for enabling a dynamic capacity planning mechanism is disclosed, where the system comprises a computing unit communicatively coupled to a server via a network. In an embodiment, the computing unit configures a plurality of operational inputs to forecast a demand volume and generate a dynamic capacity planning schedule, wherein said plurality of operational inputs comprise raw data received from a server. Further, the computing unit processes historical data based on said plurality of operational inputs to create a plurality of contextual data elements. Furthermore, the computing unit forecasts said demand volume and generates said dynamic capacity planning schedule using at I east a part of the historical data and a current capacity planning requirement, wherein said current capacity planning requirement is being generated dynamically by said server. In addition, the computing unit renders said dynamic capacity planning schedule based on said forecasted demand volume, wherein said rendered dynamic capacity planning schedule is clustered into a plurality of work reports associated with said plurality of contextual data elements.

In yet another embodiment, a non-transitory computer readable medium embodying a program executable in a computing device for enabling dynamic capacity planning is disclosed. In an embodiment, the program comprises a program code for configuring a plurality of operational inputs to forecast a demand volume and generate a dynamic capacity planning schedule, wherein said plurality of operational inputs comprise raw data received from a server. Further, the program comprises a program code for processing historical data based on said plurality of operational inputs to create a plurality of contextual data elements. Furthermore, the program comprises a program code for forecasting said demand volume and generating said dynamic capacity planning schedule using at least a part of the historical data and a current capacity planning requirement, wherein said current capacity planning requirement is being generated dynamically by said server. In addition, the program comprises a program code for rendering said dynamic capacity planning schedule based on said forecasted demand volume, wherein said rendered dynamic capacity planning schedule is clustered into a plurality of work reports associated with said plurality of contextual data elements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, e to explain the disclosed principles.

Figure 1:
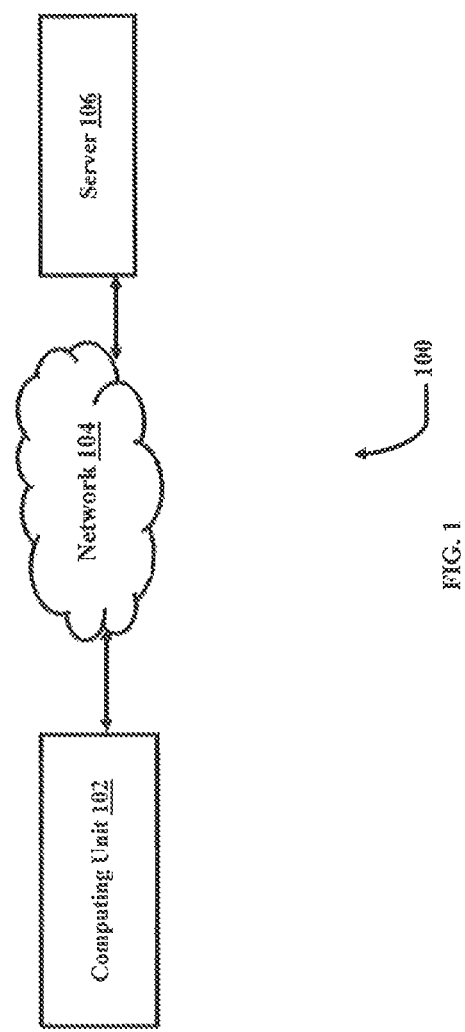
FIG. 1 illustrates a schematic diagram depicting the architecture of a dynamic capacity planning system, according to some embodiments of the present disclosure.
Figure 3:
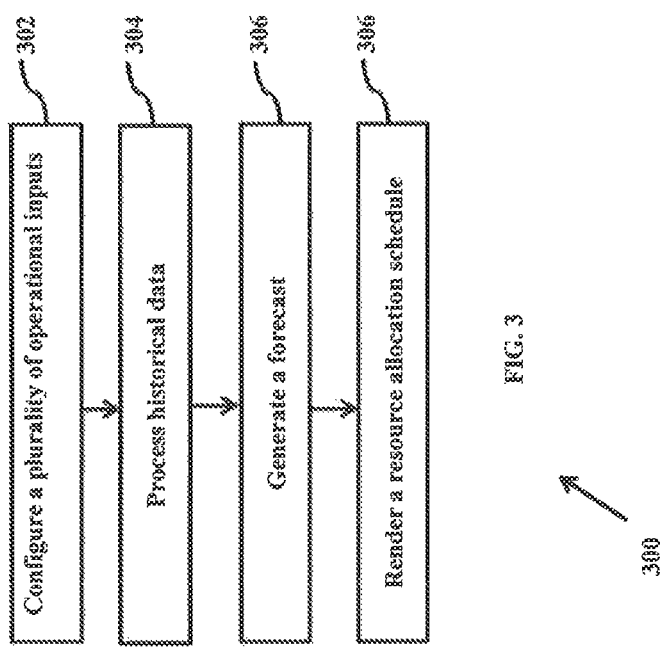
Figure 4:
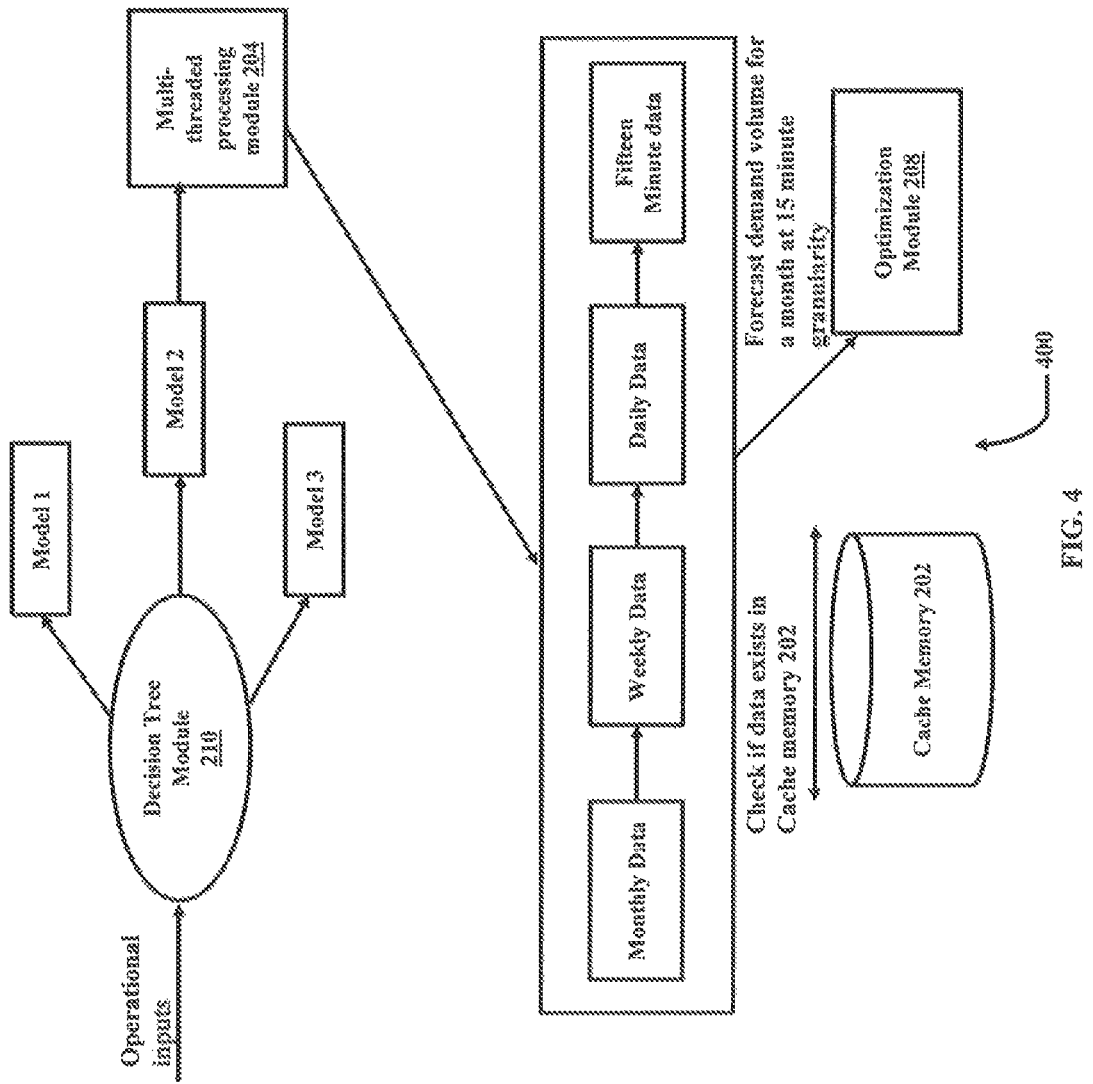

according to some embodiments of the present disclosure;

FIG. 3 illustrates a flow diagram for method depicting the high-level process flow of the dynamic capacity planning system of FIG. 1 according to some embodiments of the present disclosure; and FIG. 4 is an exemplary schematic diagram depicting the process flow according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein disclose a method and a system to generate an optimal human resource planning schedule in a dynamic manner by using decision tree models, regression analysis techniques, seasonal impact models, and neural network intelligence.

Throughout, the specification the terms "resource planning schedule" and "capacity planning schedule" are used interchangeably.

FIG. 1 illustrates a block diagram depicting the architecture of the dynamic capacity planning system 100 according to the embodiments as disclosed herein. As depicted in FIG. 1, the dynamic capacity planning system 100 comprises of a computing unit 102 connected to a network 104 which is in turn connected to a server 106. In an embodiment a computing unit 102 is connected to the server 106 throng h the network 104. The computing unit 102 may be implemented as any of a variety of conventional computing devices including but not limited to a desktop PC, a notebook or a portable computer, a mainframe computer, a mobile computing device and so on.

Further the computing unit 102 is connected over the network 104 through one or more communication links. The communication links between the computing unit 102 and the network 104 are enabled through a desired form of communication for example via dial-up modem connections, cable links, digital subscriber lines, wireless or satellite links or any other suitable form of communication.

The network 104 may be a wireless network, a wired network, or a combination thereof. The network 104 can also be an individual network or a collection of many such individual networks, interconnected with each other and functioning as a single large network, e.g., the Internet or an intranet. The network 104 can be implemented as one of the different types of networks, such as intranet, Local Area Network (LAN), Wide Area Network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 104 may include network devices, such as network switches, hubs, routers, Host Bus Adapters (HBAs), for providing a link between the computing unit 102 and the server 106.

In one implementation, the network environment 104 can be a company network, including a plurality of office personal computers, laptops, and other computing devices connected over the network 104.

Figure 2:
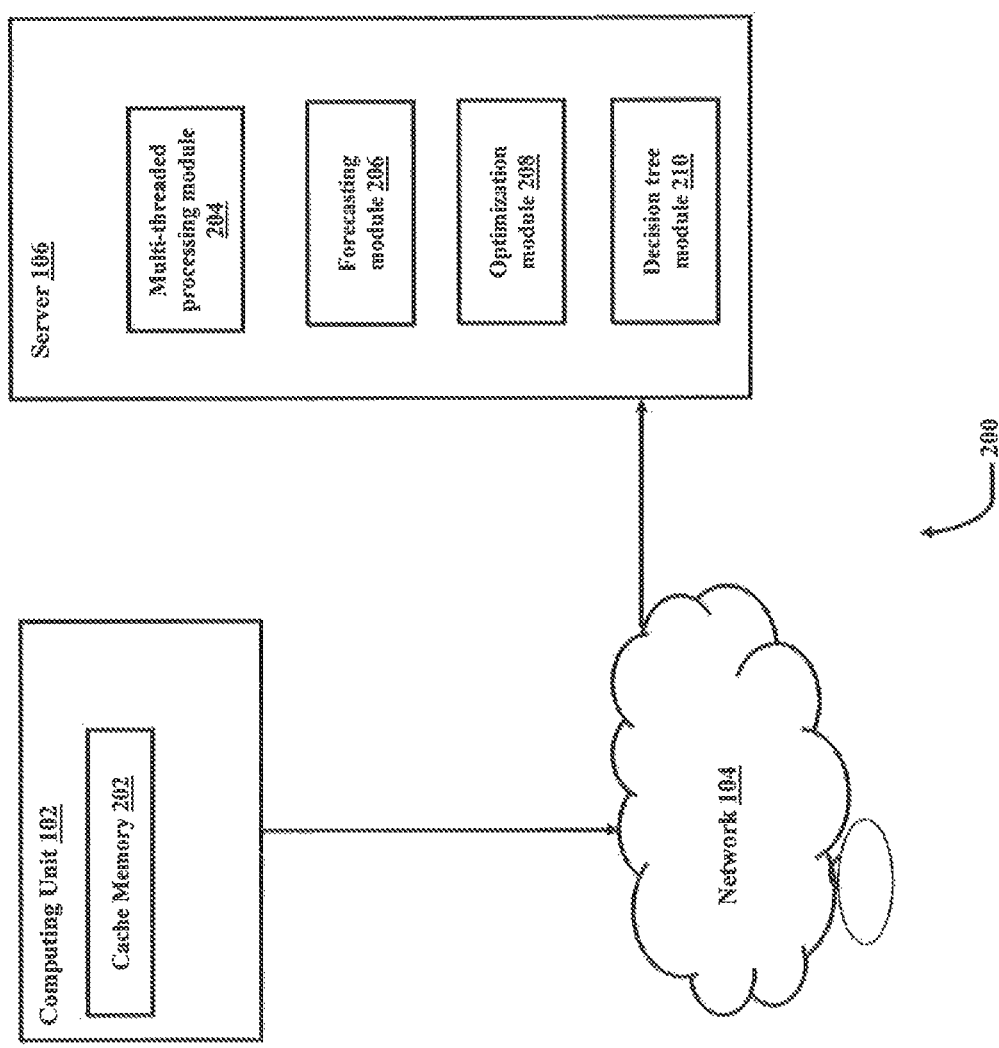
FIG. 2 illustrates a detailed component diagram of the computer architecture.

FIG. 2 with reference to FIG. 1 illustrates a detailed component diagram of the computer architecture, according to the embodiments as disclosed herein.

As depicted in FIG. 2, the computing unit 102 comprises a cache memory 202 and the server 106 include one or more processors and a memory communicatively coupled to the processors. Further, the memory includes a multi-threaded processing module 204, a forecasting module 206, an optimization module 208 and a decision tree module 210. In some embodiments, the computing unit 102 may include one or more processors or hardware processors (not shown in FIG. 1).

Further, the processors may be implemented as one or more microprocessors, microcomputers, microcontrollers, digital signal processors, central processing units, state machines, logic circuitries, and/or any devices that manipulate signals based on operational instructions. Among other capabilities, the processors are configured to fetch and execute non-transitory computer-readable instructions stored in the memory.

The cache memory 202 caches one or more outputs of a plurality of data patterns which serve as analytical models. These data patterns are stored in a high-performance unit (not shown in FIG. 2) in the cache memory 202 to optimize the speed and functioning of the dynamic capacity planning system 100. By using the high-performance unit in the cache memory 202, redundant processing of the data patterns is avoided since the cache memory 202 only stores outputs based on given operational inputs.

In an embodiment, when operational inputs comprises a set of similar values or parameters, these similar values or parameters can be cached. The values can be similar in nature depending upon the characteristics of average handling times, shift timings, nature of work allocation and so on. Therefore, when certain data-points of the successive set of operational inputs match with existing data patterns stored in the high-performance unit of the cache memory 202, the output can directly be fetched from cache memory 202 and given for further processing thereby utilizing and populating a skeletal resource allocation schedule stored in the cache memory 202 in order to avoid intensive computational processing. The skeletal resource allocation schedule can be in the form of a pre-defined resource allocation template which comprises details about basic organization related parameters for creating a capacity planning schedule.

For example, certain key values can be stored in the cache memory 202 as key values indicate quarterly forecast parameter, such as for example (Value=15 min demand data)—Consider there are 10 operational inputs for generating the dynamic capacity planning schedule and the total time taken for processing the 10 operational inputs is 5 seconds. In case, out of 10 operational inputs, 5 operational inputs possess similar characteristics, then, when these 10 operational inputs are cached, and considering the time taken as 500 minutes, of execution time per input and 5 minutes of cache fetch time for each input, a total of 2.65 seconds are spent for processing 10 operational inputs, thereby achieving 47% optimization in the w hole operation.

The multi-threaded processing module 204 facilitates simultaneous computation of multiple operational inputs which results a considerably faster computation of one or more outputs for further processing. Additionally, static data refers to incoming state of data where an available capacity is lower than the needed capacity for a defined time span. Dynamic capacity refers to an incoming state of data where the needed capacity is lower than the available capacity in total, but during, a certain period there may be higher load than the required capacity.

A regression model stored in the multi-threaded processing module 204, connects to a neural network model to help predict one or more forecasts. Neural network models in artificial intelligence are usually referred to as artificial neural networks (ANNs); these are essentially mathematical models defining a function f: X->Y or a distribution over X or both X and Y. In an embodiment, the multi-threaded processing module 204 detects a task loading pattern of an individual thread to dynamically allocate a set of work units.

Case analysis 1—Consider a dual core processor processing 4 operational inputs, with 2 operational inputs being executed on 2 different cores. Thus, the time taken for executing an operational input is reduced to one fourth of the time taken in, conventional techniques, where conventional techniques execute 4 operational inputs sequentially on a single core. Essentially, multiple cores can run multiple instructions at the same time, increasing overall speed for programs amenable to parallel computing.

Case analysis 2: Consider the computing unit 102 having a memory of 4 GB RAM, dual core processor at 1.7 GHz and 2 million records getting executed in 5 minutes in a single threaded model. By implementing the multi-threaded processing module 204, the 2 million records can be simultaneously processed by multi-threaded models in the multi-threaded processing module in 2.5 minutes thus achieving 2.5 minutes of throughput. For sake of consistency, dual core processors are explained although the above example intends to refer to other multi-core processors such as Octa core processors.

The forecasting module 206 uses a seasonal impact model along with regression analysis techniques to analyze interactions between at least one independent and one dependent variable. For example, the independent variables refer to parameters such as shift span time, number of resources, transaction volume of previous years, a service level agreement and a forecast, while the dependent variable is the optimal resource utilization.

Further the forecasting module 206 is able to indicate when one or more independent variables go through a significant amount of interaction with one or more dependent variables and can also indicate a relative strength of different independent variables effects on a dependent variable.

The optimization module 208 facilitates parallel execution of a plurality of tasks on individual cores. The decision tree module 210 facilitates scalability of historical data wherein new data patterns can be plugged in the decision tree module 210 and therefore data patterns are appropriately selected according to dynamic capacity planning requirements. Data patterns refers to the type, amount, and characteristic of data received at a particular period of time. For example, 1.5 GB of static data comprising certain operational inputs may be received at 6 pm on Tuesday to create a service level agreement on Wednesday.

FIG. 3 illustrates a flow diagram for method 300 depicting the high-level process flow of the dynamic capacity planning system 100 of FIG. 1 according to the embodiments as disclosed herein. At step 302, a plurality of operational inputs are configured dynamically to forecast a demand volume and generate a capacity planning schedule. The operational inputs could include raw data received from the server 106. The operational inputs may vary in volume when received at specific time intervals thus resulting in a dynamic resource capacity requirement. For example, the volume of a first set of operational inputs received at 10:00 AM may be different from the volume of a second set of operational inputs received at 1:00 PM and so on.

The operational inputs include a pre-defined service level agreement but are not limited to the below mentioned features:

a) Previous year's historical transactional volume data such as a one year transaction log which include the information about number of transactions received for the past one year. These transactions indicate users logging in different time periods at multiple shifts.

b) Shift start and shift end time that specify Start and End Time of various Shifts. A shift is a pre-defined time duration during which a resource is utilized. The shift may be overlapping or successive in nature.

c) Break start time/End time: Each Shift may have multiple breaks. Break Start and break end Time specify the predefined time duration during which resources may avail a break in a particular shift.

d) Average handling time (AHT): AHT may specify a pre-defined average time required to finish a particular type of work by the resource.

In the context of the embodiments herein, a service level agreement (SLA) is a contract between a service provider (either internal or external) and the end user that defines the level of service expected from the service provider. Every SLA is unique and time bound in nature. In the dynamic capacity planning system 100, SLAs are used to define the necessary Quality of Service (Qos) for an application or users in an IT system. Varying demand of resources, skill sets, and task requirements require either fixed SLAs or Dynamic SLAs where the dynamic capacity planning system 100 monitors, detects, and responds interactively to ensure that process requirements are met.

At step 304, historical data is processed based on the plurality of operational inputs to primarily create a plurality of contextual data elements. The contextual data elements refer to different clusters in which the output gets aggregated. The dynamic capacity planning system 100 gainfully takes advantage of a core processing logic to organize the historical data into multiple contextual data elements. The multiple contextual data elements are preferentially loaded into an in-memory database alternatively referred as to as the cache memory 202, thereby enabling discrete execution of the core processing logic based on the multiple data elements eventually leading to a contextual aggregation of the output. For example historical data comprises transaction logs of the past few years.

Historical data resides in the cache memory 202 and serves as reference data by creating certain data patterns which are in the form of a skeletal resource allocation schedule. As and when a continuous stream of operational inputs are received by the computing unit 102, a particular skeletal resource allocation schedule is intelligently chosen and fine-tuned to enable forecasting of a finished dynamic resource allocation schedule.

At step 306 when at least one current capacity planning requirement is fed to the server 106, a forecast is generated simultaneously at the computing unit 102 using the skeletal resource allocation schedule. In an embodiment one or more forecasts can be generated simultaneously for different capacity planning requirements. The different capacity planning requirements may be fed to the server 106 in intervals ranging from (for example) 5 to 10 minutes.

At step 308, based on the generated forecast a ready to implement capacity planning schedule is rendered on the computing unit 102. The capacity planning schedule is clustered into a plurality of work reports associated with multiple contextual data elements. For example, the work reports are intelligently displayed to provide a comprehensive coverage of the capacity planning schedule. The work report may comprise data indicating number and identity of resources to map an identified resource to a particular task based on at least one of skillset, average time taken for the particular task, availability during the given shift. In certain cases when a particular resource is unavailable, the dynamic capacity planning system 100 can also recommend a suitable alternative resource with similar skill sets to work on a given task.

It will be noted herein that various actions/steps in method 300 may be performed in the order presented, in a different order or simultaneously. Further, in some embodiments, some actions listed in FIG. 3 may be omitted.

FIG. 4 is an exemplary schematic diagram 400 depicting the process flow according to the embodiments as disclosed herein. As depicted in FIG. 4, initially the server 106 receives certain operational inputs in the form of a quarterly or monthly forecast or a previous year's actual work demand for a month. Based on these inputs, the decision tree module 210 in the server 106 categorizes the operational inputs into a plurality of contextual clusters. Thereafter, the multi-threaded processing module 204 applies a regression analysis based on the data received from the decision tree module.

At this point, the operational inputs which were initially received in the form of historical data is categorized into at least three forms of different inputs such as a previous years monthly demand volume a previous years weekly demand volume, a previous years daily demand volume and demand volume forecasted for a 15 minute duration upon performing a decision tree modelling process and a regression analysis. Therefore, the mechanism of the dynamic capacity planning system 100 can be sub-divided into two stages as defined below:

Stage 1: At this stage number of resources needed for the next one month at a fifteen minute granularity level are forecasted using the regression analysis technique to primarily determine the relationship between a provide's forecasted quarterly demand and the actual quarterly demand.

Further, the regression analysis technique is additionally used to forecast the actual quarter demand volume and this forecast is smoothed by fitting inputs obtained after performing regression analysis to filter out the noise data.

Stage 2: At this stage an optimal number of resources is determined for the next one month on a shift level basis. This is achieved by using a steady state queueing theory approach where the (actual) number of resources can be estimated at a five minute interval by using the equation $Rtp=(\lambda tp/\mu p)+\alpha*(\lambda tp/\mu p)$, where a is confidence level.

During the forecasting process the embodiments herein also perform a data caching process where a map of input data and output data is created. This mapping is primarily done to check if similar patterns of data exist in cache memory 202. Once the check is done and it is found that similar patterns of data exist in the cache memory 202, the existing input data is used to generate a fifteen minute output data segmented into time periods of a month, week, day or a minute. Finally by using the optimization module 208, an output shift schedule is generated to meet the pre-defined service level agreement. The output shift schedule primarily indicates the number of resources estimated after performing the forecasting, and optimization techniques, to meet the service level agreements. The output shift schedule also highlights surplus or deficit resources in case a resource cap is set as compared to the actual number of resources (estimated by using the steady state equation) required. Thereby an additional amount of accuracy is achieved.

The embodiments use the hardware modules with the ability to perform parallel processing such as multithreading for managing huge datasets. Parallel processing exploits Multi Cores, by adopting divide and conquer policy, to optimally run the forecasting algorithm to improve the performance.

The performance of the core processing logic gets further enhanced by organizing the historical data into multiple contextual clusters, which gets loaded into the cache memory 202, thereby enabling discrete execution based on these clusters, and then the output gets contextually aggregated.

Essentially, the dynamic capacity planning system 100 is designed for effective human resource planning considering different skill types/average handling times and SLAs. The dynamic capacity planning system 100 is configured to meet both fixed SLAs and dynamic SLAs by automating the resource allocation/capacity planning processes for multiple transaction types having fixed SLAs (for about 15 minutes) and varying SLAs as per multiple skill based cut offs.

For example, assume Skill X has a cut-off at 18:30 IST and when a transaction comes in a queue of the server 106 at 14:30 IST, then the SLA is effectively 4 hours. Similarly, when a transaction comes in at 17:30 IST, then the SLA is effectively 1 hour. It can be inferred that the dynamic capacity planning system 100 generates the resource allocation schedule (for various transaction types having different AHTs) to satisfy fixed SLAs as well as variable SLAs for different transaction types.

As will be understood by those familiar with the art, the invention may be embodied in other specific form s without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, I.e., be non-transitory. Examples include random access memory (RAM), read-only memory (ROM), volatile memory, nonvolatile memory hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for enabling dynamic capacity planning, said method comprising:

configuring, by one or more hardware processors, a plurality of operational inputs to forecast a demand volume and generate a dynamic capacity planning schedule, wherein said plurality of operational inputs comprise raw data received from a server;

multi-threaded processing, by the one or more hardware processors, of historical data based on said plurality of operational inputs to create a plurality of contextual data elements and loading the plurality of contextual data elements into a cache memory; wherein said processing includes fetching a data pattern from the cache memory based on parallel processing of said plurality of operational inputs received from said server;

generating, by the one or more hardware processors, a skeletal resource allocation schedule based on the data pattern fetched from the cache memory;

forecasting, by the one or more hardware processors, said demand volume based on a seasonal impact model along with regression analysis techniques;

generating, by the one or more hardware processors, said dynamic capacity planning schedule using at least a part of the historical data and a current capacity planning requirement, wherein said current capacity planning requirement is being generated dynamically by said server based on the skeletal resource allocation schedule;

rendering, by the one or more hardware processors, said dynamic capacity planning schedule based on said forecasted demand volume, wherein said rendered dynamic capacity planning schedule is clustered into a plurality of work reports associated with said plurality of contextual data elements; and displaying, by the one or more hardware processors, to a user, the plurality of work reports associated with said plurality of contextual data elements to provide a comprehensive coverage of the dynamic capacity planning schedule.

2. The computer implemented method of claim 1, further comprising creating a data pattern dynamically upon configuring said plurality of operational inputs based on a decision model.

3. The computer implemented method of claim 1, wherein said seasonal impact model analyzes an interaction between at least one of an independent variable and a dependent variable, wherein said independent variable is at least one of a shift span time, number of resources, one year transaction volume data, a service level agreement, and a forecast, and wherein said dependent variable is an optimal resource utilization schedule.

4. A computer implemented system for enabling dynamic capacity planning, the system comprising:

a computing unit; and a server communicatively coupled to said computing unit via a network, wherein said computing unit is configured to:

configure a plurality of operational inputs to forecast a demand volume and generate a dynamic capacity planning schedule, wherein said plurality of operational inputs comprise raw data received from said server;

perform multi-threaded processing of historical data based on said plurality of operational inputs to create a plurality of contextual data elements and loading the plurality of contextual data elements into a cache memory, wherein said processing includes fetching a data pattern from the cache memory based on parallel execution of said plurality of operational inputs received from said server;

generate a skeletal resource allocation schedule based on the data pattern fetched from the cache memory;

forecast said demand volume based on a seasonal impact model along with regression analysis techniques;

generate said dynamic capacity planning schedule using at least a part of the historical data and a current capacity planning requirement, wherein said current capacity planning requirement is being generated dynamically by said server based on the skeletal resource allocation schedule;

render said dynamic capacity planning schedule based on said forecasted demand volume, wherein said rendered dynamic capacity planning schedule is clustered into a plurality of work reports associated with said plurality of contextual data elements; and display, to a user, the plurality of work reports associated with said plurality of contextual data elements to provide a comprehensive coverage of the dynamic capacity planning schedule.

5. The computer implemented system of claim 4, wherein said plurality of contextual clusters are segregated into at least one of an Average Handling Time (ANT), Shift Span Time (SST) and Service Level Agreement (SLA).

6. The computer implemented system of claim 4, wherein said computing unit further comprises the cache memory configured to store a plurality of analytical models, wherein said plurality of analytical models serve as reference data to dynamically predict said optimal resource allocation schedule.

7. The computer implemented system of claim 4, wherein said server is further configured to detect a task loading pattern of an individual thread to dynamically allocate a set of work units.

8. The computer implemented system of claim 4, wherein said server is further configured to connect to a neural network model to predict a forecast upon performing said regression analysis.

9. The computer implemented system of claim 8, wherein said neural network is configured to utilize artificial intelligence to dynamically load at least one thread sequentially in said server.

10. A non-transitory computer readable medium embodying a program executable in a computing device for enabling dynamic capacity planning, said program comprising:

a program code for configuring a plurality of operational inputs to forecast a demand volume and generate a dynamic capacity planning schedule, wherein said plurality of operational inputs comprise raw data received from a server;

a program code for multi-threaded processing of historical data based on said plurality of operational inputs to create a plurality of contextual data elements and loading the plurality of contextual data elements into a cache memory, wherein said processing includes fetching a data pattern from the cache memory based on parallel processing of said plurality of operational inputs received from said server;

a program code for generating a skeletal resource allocation schedule based on the data pattern fetched from the cache memory;

a program code for forecasting said demand volume based on a seasonal impact model along with regression analysis techniques, and;

a program code for generating said dynamic capacity planning schedule using at least a part of the historical data and a current capacity planning requirement, wherein said current capacity planning requirement is being generated dynamically by said server based on the skeletal resource allocation schedule;

a program code for rendering said dynamic capacity planning schedule based on said forecasted demand volume, wherein said rendered dynamic capacity planning schedule is clustered into a plurality of work reports associated with said plurality of contextual data elements; and a program code for displaying, to a user, the plurality of work reports associated with said plurality of contextual data elements to provide a comprehensive coverage of the dynamic capacity planning schedule.

* * * * *